US008634865B2

(12) United States Patent
Sakata et al.

(10) Patent No.: US 8,634,865 B2
(45) Date of Patent: Jan. 21, 2014

(54) TRANSMITTING APPARATUS, RECEIVING APPARATUS AND METHOD

(75) Inventors: Ren Sakata, Yokohama (JP); Koichiro Ban, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 302 days.

(21) Appl. No.: 13/230,943

(22) Filed: Sep. 13, 2011

(65) Prior Publication Data

US 2012/0064933 A1 Mar. 15, 2012

Related U.S. Application Data

(63) Continuation of application No. PCT/JP2010/052650, filed on Feb. 22, 2010.

(30) Foreign Application Priority Data

Mar. 13, 2009 (JP) .................................. 2009-061987

(51) Int. Cl.
*H04B 7/00* (2006.01)
*H04W 72/00* (2009.01)

(52) U.S. Cl.
USPC ........ 455/509; 455/450; 455/451; 455/452.1; 455/452.2

(58) Field of Classification Search
USPC ............ 455/509, 450, 451, 452.1, 452.2, 453
See application file for complete search history.

(56) References Cited

U.S. PATENT DOCUMENTS

| 7,929,407 | B2 * | 4/2011 | Ma et al. ........................ 370/203 |
| 2008/0186843 | A1 * | 8/2008 | Ma et al. ........................ 370/210 |
| 2011/0164491 | A1 * | 7/2011 | Ma et al. ........................ 370/210 |
| 2011/0164492 | A1 * | 7/2011 | Ma et al. ........................ 370/210 |
| 2011/0274074 | A1 * | 11/2011 | Lee et al. ........................ 370/329 |
| 2012/0014349 | A1 * | 1/2012 | Chung et al. .................... 370/329 |
| 2013/0010685 | A1 * | 1/2013 | Kim et al. ........................ 370/315 |
| 2013/0064099 | A1 * | 3/2013 | Kim et al. ........................ 370/241 |

FOREIGN PATENT DOCUMENTS

| JP | 2011-511506 A | 4/2011 |
| WO | 2009/001594 A1 | 12/2008 |

OTHER PUBLICATIONS

English translation of IPRP dated Oct. 27, 2011 from JP PCT/JP2010/052650; 6 pages.
Huawei, "PDCCH Design for Carrier Aggregation"; Jan. 2009; pp. 1-5; R1-090127; 3GPP TSG RAN WG!#55bis.

(Continued)

*Primary Examiner* — Tilahun B Gesesse
(74) *Attorney, Agent, or Firm* — Ohlandt, Greeley, Ruggiero & Perle, L.L.P.

(57) ABSTRACT

According to one embodiment, a transmitting apparatus includes a transmitting unit and a selecting unit. The transmitting unit transmits first control information using one of first communication resources. The first communication resources are included in a first transmission band and have respective independent numbers. The transmitting unit transmits second control information using one of second communication resources. The second communication resources are included in a second transmission band and have respective independent numbers. The selecting unit restricts the second communication resources to restricted second communication resources in accordance with a number assigned to one of the first communication resources used to transmit the first control information, and to select one second communication resource from the restricted second communication resources. The transmitting unit transmits the second control information using the selected second communication resource.

10 Claims, 12 Drawing Sheets

(56) References Cited

OTHER PUBLICATIONS

ZTE, "Downlink Control Structure for LTE-A"; Feb. 2009, pp. 1-5; R1-090628; 3GPP TSG-RAN WG1 meeting #56.
Technical Specification; 3GPP TS 36.211; "Physical Channels and Modulation", Ver. 8.3.0., May 2008, pp. 1-77.
Technical Specification, 3GPP TS 36.213. "Physcial Layer Procedures"; Ver. 8.3.0; May 2008; pp. 1-45.
NTT Docomo, Inc., 3GPP TSG RAN WG1 Meeting #54; "Update View on Support of Wider Bandwidth in LTE-Advanced"; R1-083015,Aug. 2008; pp. 2-19.
International Search Report and Written Opinion dated May 25, 2010 from PCT/JP2010/052650.
Japanese Search Report dated Apr. 24, 2012 from JP 2009-061987.
CMCC; "Evaluation Methodology for LTE-A—Carrier Aggregation"; http://www.3gpp.org/ftp/tsg_ran/WG12_RL1/TSGR1_55b/Docs/R1-090337.zip; Jan. 10, 2009; 7 pages.

* cited by examiner

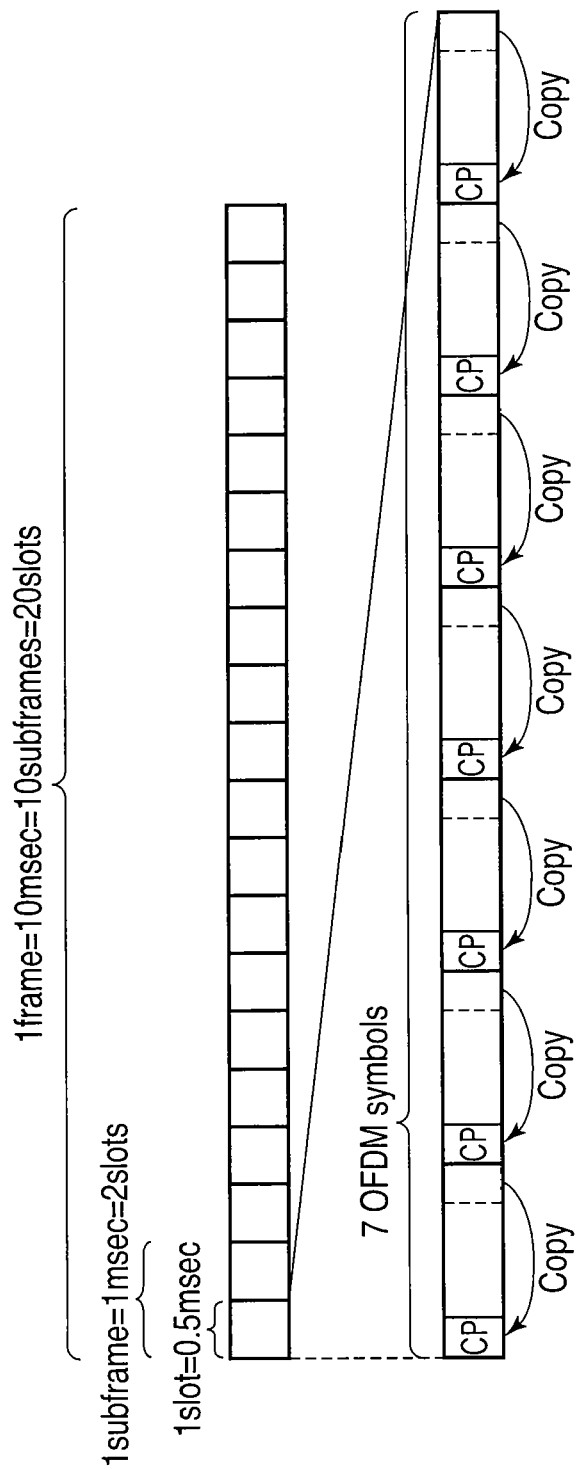
F I G. 4

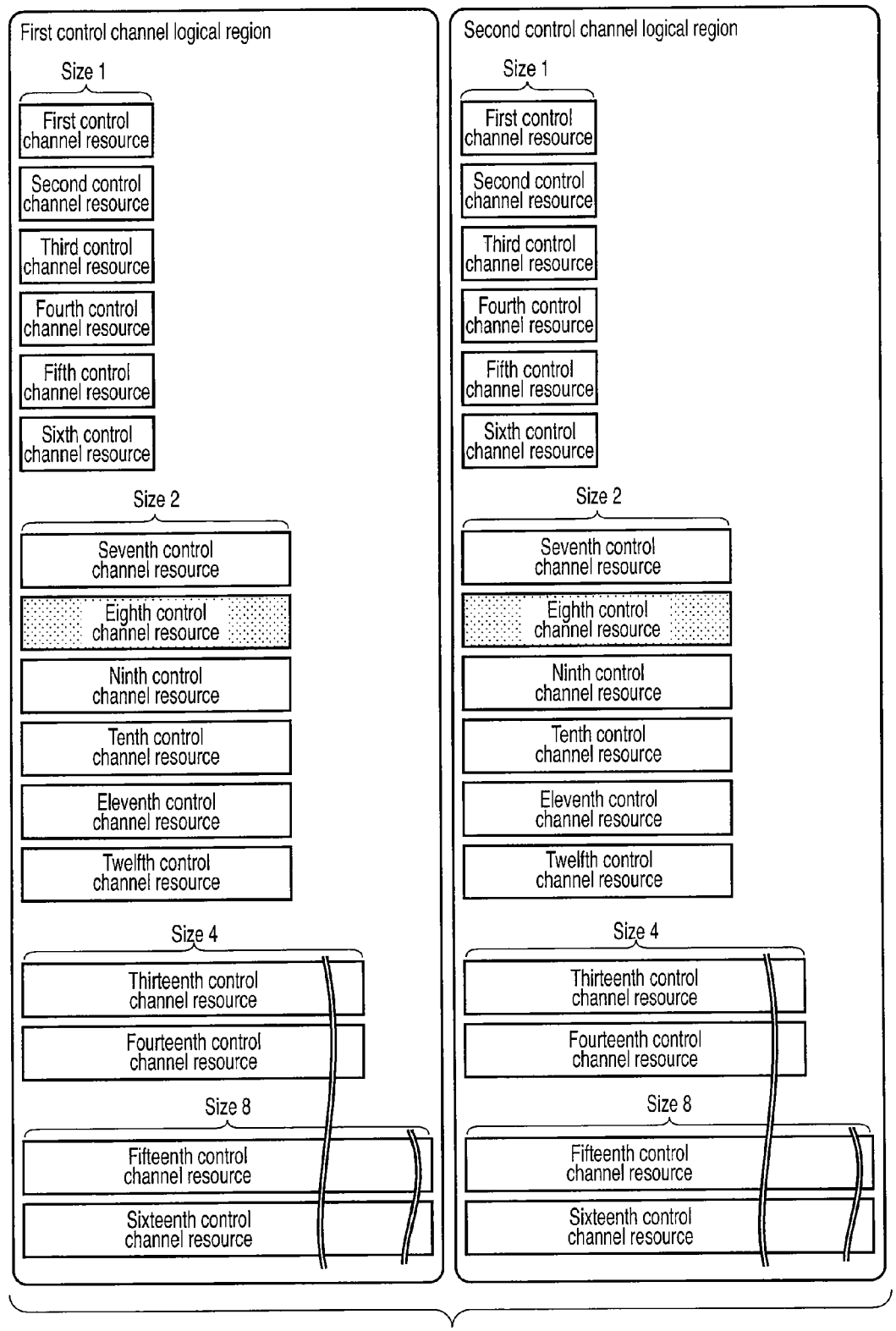
F I G. 10

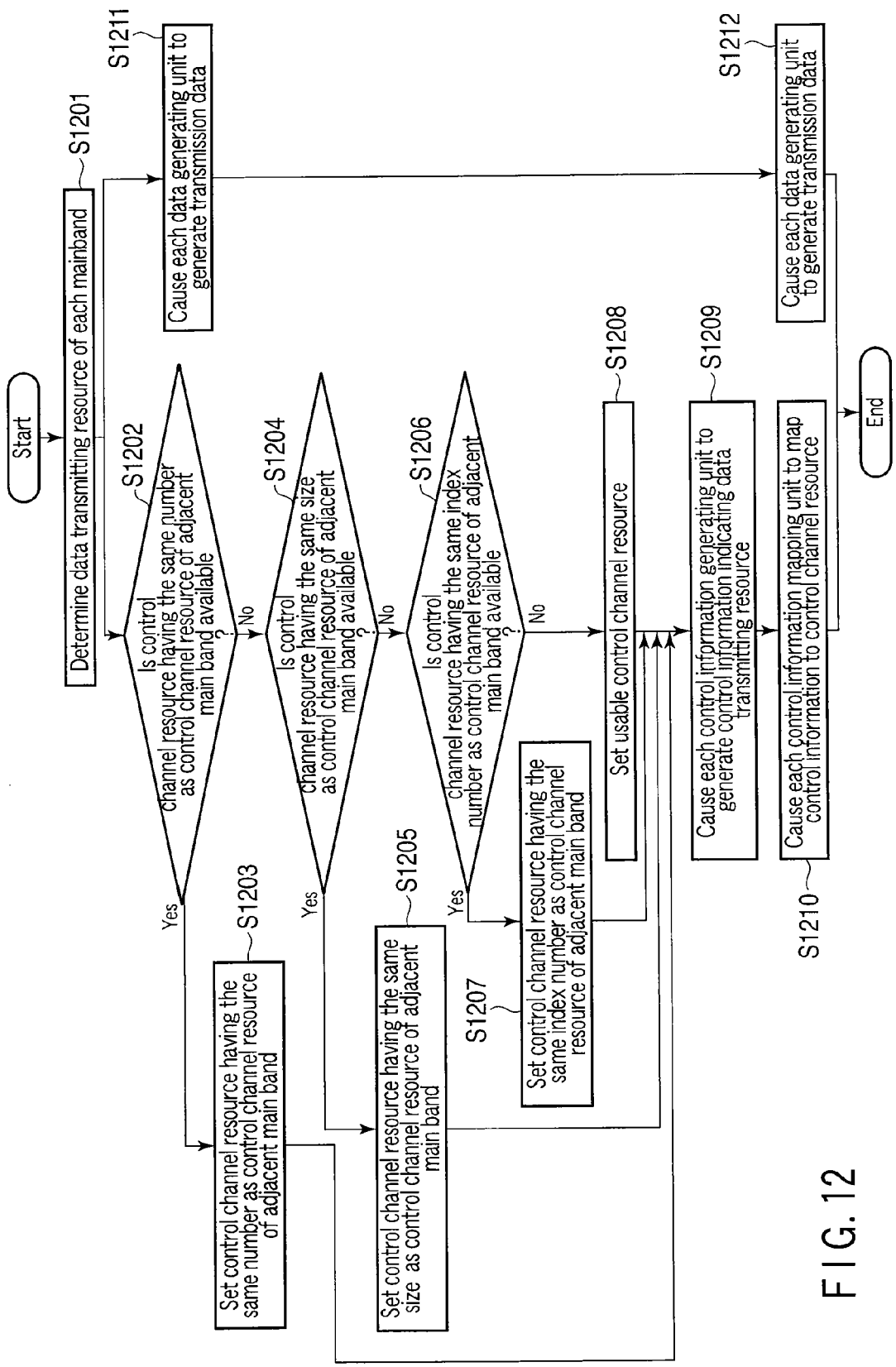
F I G. 12

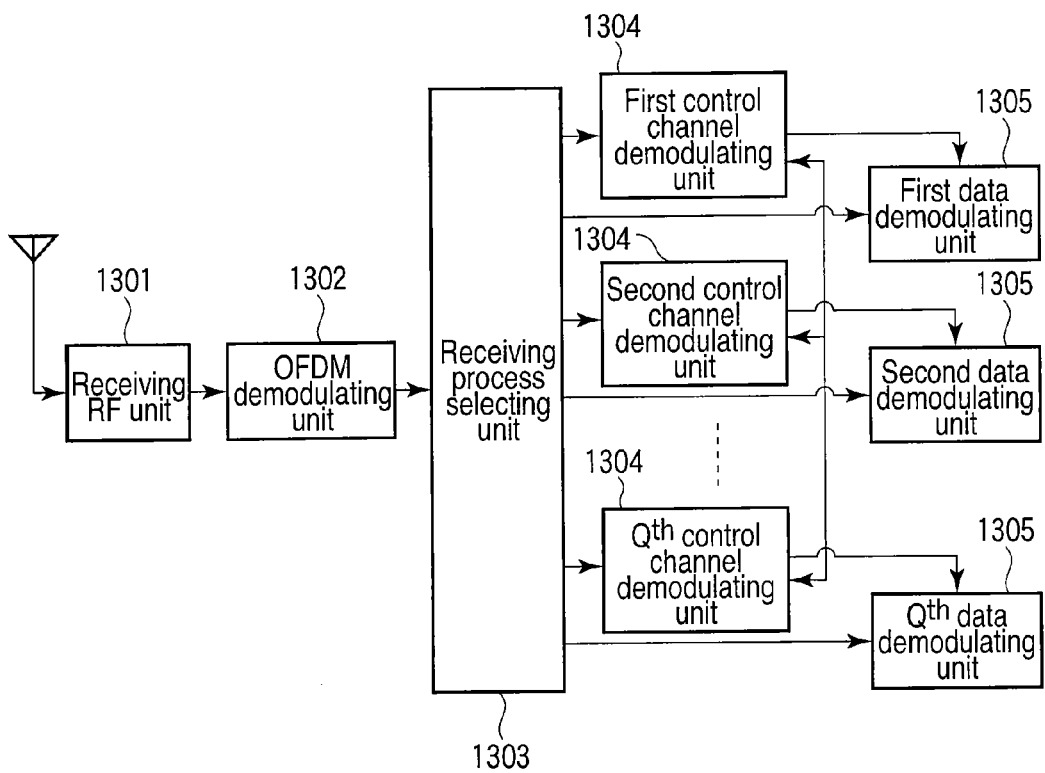
F I G. 13

TRANSMITTING APPARATUS, RECEIVING APPARATUS AND METHOD

CROSS REFERENCE TO RELATED APPLICATIONS

This application is a Continuation Application of PCT Application No. PCT/JP2010/052650, filed Feb. 22, 2010 and based upon and claiming the benefit of priority from prior Japanese Patent Application No. 2009-061987, filed Mar. 13, 2009, the entire contents of all of which are incorporated herein by reference.

FIELD

Embodiments described herein relate generally to a transmitting apparatus, a receiving apparatus and a method for transmitting and receiving control signals (control information) used to individually control a plurality of transmission bands.

BACKGROUND

In a cellular communication system, which handles simultaneous communication involving many users, as well as transmitting user data it is necessary to transmit control information associated with the user data. To ensure the control information will reach the handsets of all communicating users, a large number of communication resources must be used for its transmission (see, for example, Document 1: 3GPP, "Evolved Universal Terrestrial Radio Access [E-UTRA]; Physical Channels and Modulation [Release 8]," TS36.211, ver. 8.3.0 [2008]). However, since the control information streams are exclusively for control and do not include embedded user data, allocation of such a large number of resources to the control information is at the expense of user data and so can reduce throughput. To avoid such a reduction, Document 1 discloses a method for transmitting control information of variable size.

To deal with such variable-size control information, there is a means of detecting control information addressed to the handset of a particular user in control information transmitted to the handsets of all users when the size of control information for the handset of the particular user is unknown (see, for example, Document 2: 3GPP, "Evolved Universal Terrestrial Radio Access [E-UTRA]; Physical layer procedures [Release 8]," TS36.213, ver. 8.3.0 [2008]). The means disclosed in Document 2 involves a blind detection method which makes multiple attempts to demodulate control information while assuming various possible sizes of item, and determining that the control information is addressed to the handset of the user if it can be correctly demodulated. However, since considerable time and processing are required to demodulate all control information, a subset of control information to undergo attempted demodulation is determined for each user.

As well as the above techniques, there is a technique of increasing throughput by using a plurality of communication bands simultaneously (see, for example, Document 3: NTT DoCoMo, "Update Views on Support of Wider Bandwidth in LTE-Advanced," 3GPP Technical Document, R1-083015 [2008]).

If plural communication bands are used simultaneously as disclosed in Document 3, and if the control information, as described in Document 1, in each band is detected by the blind detection method described in Document 2, the amount of control information undergoing attempted demodulation by the blind detection method increases with the number of bands. However, it is desirable to avoid such an increase in the number of demodulation attempts because of the added load it imposes.

BRIEF DESCRIPTION OF THE DRAWINGS

FIG. 4 is a view illustrating a frame structure employed in the communication system of FIG. 1;

FIG. 10 is a view illustrating examples of control channel resource pairs (logical resource pairs) employed in the first embodiment, each of the control channel resource pairs having the same number;

FIG. 12 is a flowchart useful in explaining an operation example of the transmitting apparatus shown in FIG. 11;

FIG. 13 is a block diagram illustrating a receiving apparatus employed in the first embodiment.

DETAILED DESCRIPTION

In general, according to one embodiment, a transmitting apparatus includes a transmitting unit and a selecting unit. The transmitting unit transmits first control information using one of first communication resources. The first communication resources are included in a first transmission band and have respective independent numbers. The transmitting unit transmits second control information using one of second communication resources. The second communication resources are included in a second transmission band and have respective independent numbers. The selecting unit restricts the second communication resources to restricted second communication resources in accordance with a number assigned to one of the first communication resources used to transmit the first control information, and to select one second communication resource from the restricted second communication resources. The transmitting unit transmits the second control information using the selected second communication resource.

The embodiments provide a transmission apparatus, a receiving apparatus and a method that facilitate detection of control information in a way that reduces the load imposed by blind detection when plural communication bands are used simultaneously.

Transmission and receiving apparatuses and a method according to embodiments will be described in detail with reference to the accompanying drawings. In the embodiments, like reference numbers denote like elements, and no duplicate explanations will be given.

First Embodiment

Figure 1:
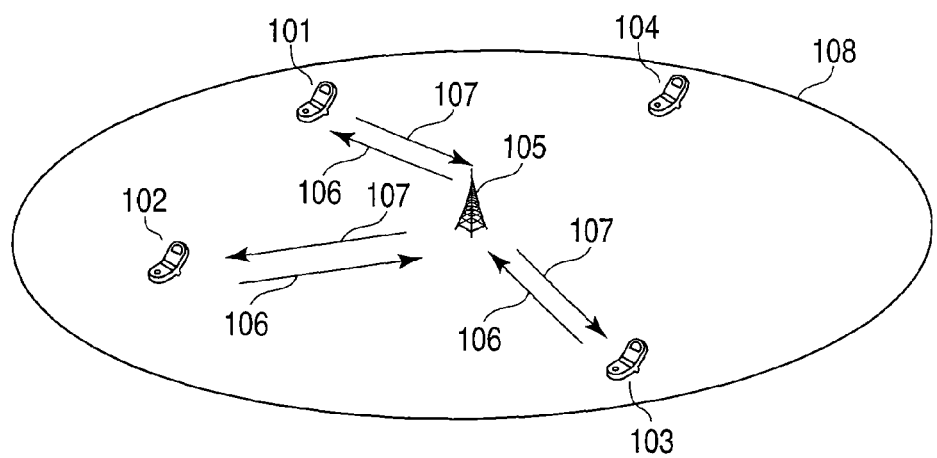
FIG. 1 is a view illustrating a communication system according to a first embodiment.
Figure 2:
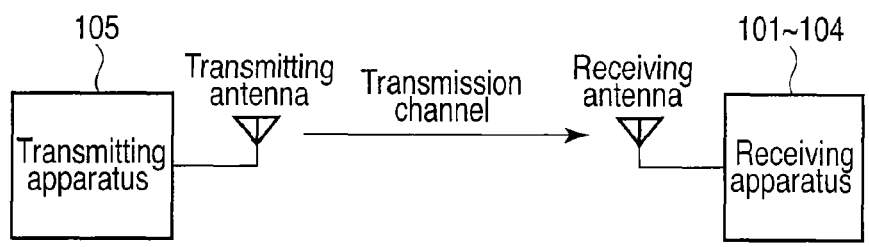
FIG. 2 is a view useful in explaining a downlink transmission between a transmitting apparatus and a receiving apparatus according to the first embodiment.

Referring first to FIGS. 1 and 2, a communication system including the transmission and receiving apparatuses according to the embodiments will be described. FIG. 1 shows the configuration of the communication system of the first embodiment.

The communication system comprises a base station 105, and a plurality of terminals 101 to 104. The communication channel from each terminal to the base station will hereinafter be referred to as an uplink 106, and the communication channel from the base station to each terminal be referred to as a downlink 107. Assume here that the downlink utilizes orthogonal frequency division multiple access (OFDMA). In the first embodiment, the base station 105 corresponds to the transmitting apparatus, and each terminal 101-104 corresponds to the receiving apparatus. The base station 105 provides a service area 108.

FIG. 2 is a view useful in explaining the downlink. The base station 105 modulates user data and transmits an RF signal corresponding to the modulated user data via a transmission antenna. The RF signal reaches the receiving antennas of the terminals 101 to 104 via channels. The terminals 101 to 104 as receiving apparatuses process the signal received by their receiving antennas.

Figure 3:
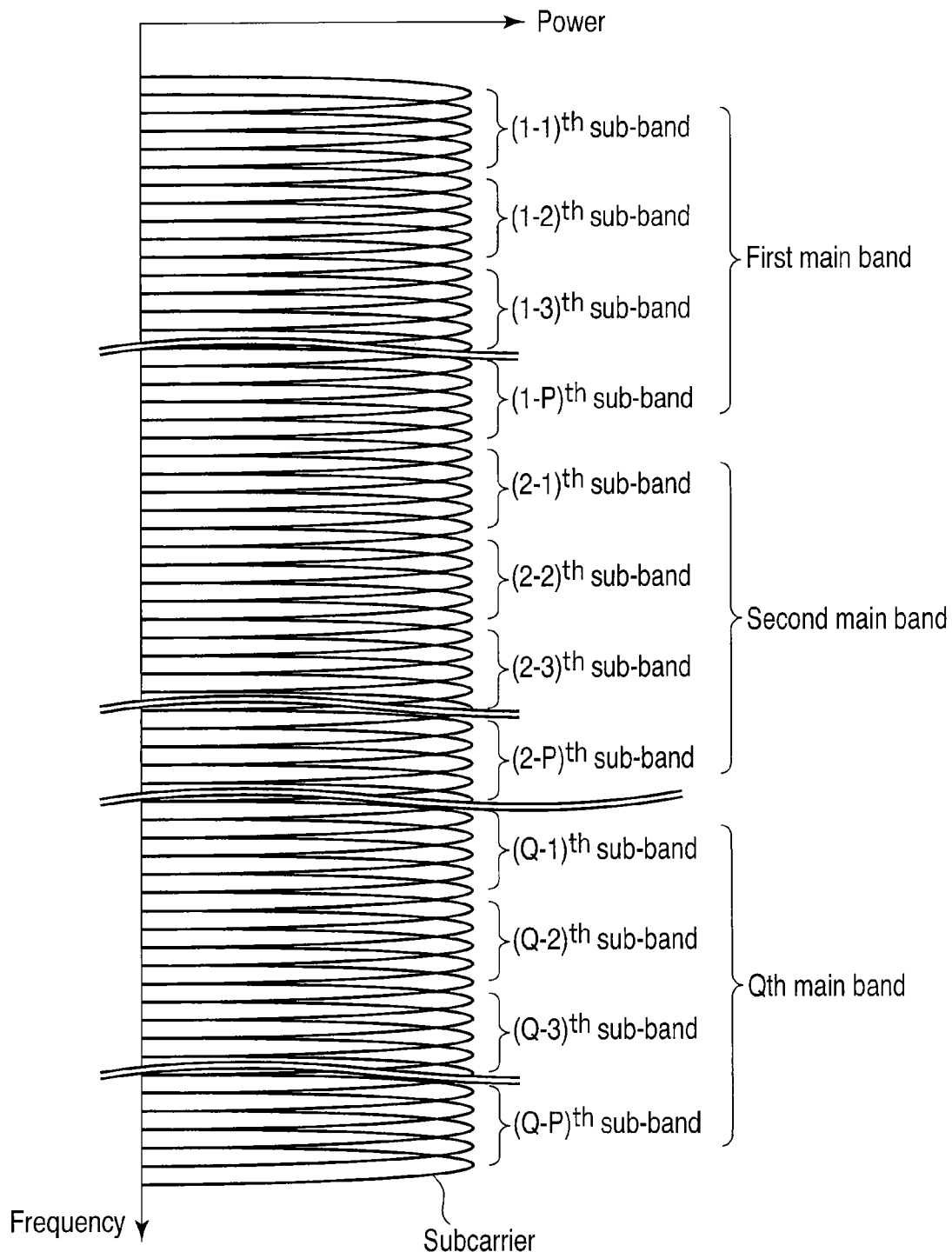
FIG. 3 is a view illustrating a subcarrier structure employed in the first embodiment.

Referring then to FIG. 3, a subcarrier structure for OFDMA communication will be described. FIG. 3 shows the subcarrier structure for the OFDMA communication employed in the first embodiment. Assume here that the total number of subcarriers is N, that the N subcarriers are divided into Q main bands as transmission bands, and that each main band is divided into P sub-bands (N, Q and P: positive integers).

Referring then to FIG. 4, a frame structure in time domain will be described. FIG. 4 shows the frame structure in time domain employed in the first embodiment.

In the first embodiment, assume that one frame corresponds to 10 msec and is divided into 10 sub-frames each corresponding to 1 msec. Data is carried by each sub-frame. Namely, data is transmitted in units of 1 msec. Each sub-frame is divided into two slots of 0.5 msec. One slot contains seven OFDM symbols. One OFDM symbol includes a portion called a cyclic suffix in which a signal indicating the posterior half of the symbol is copied and added to the anterior half of the symbol.

Figure 5:
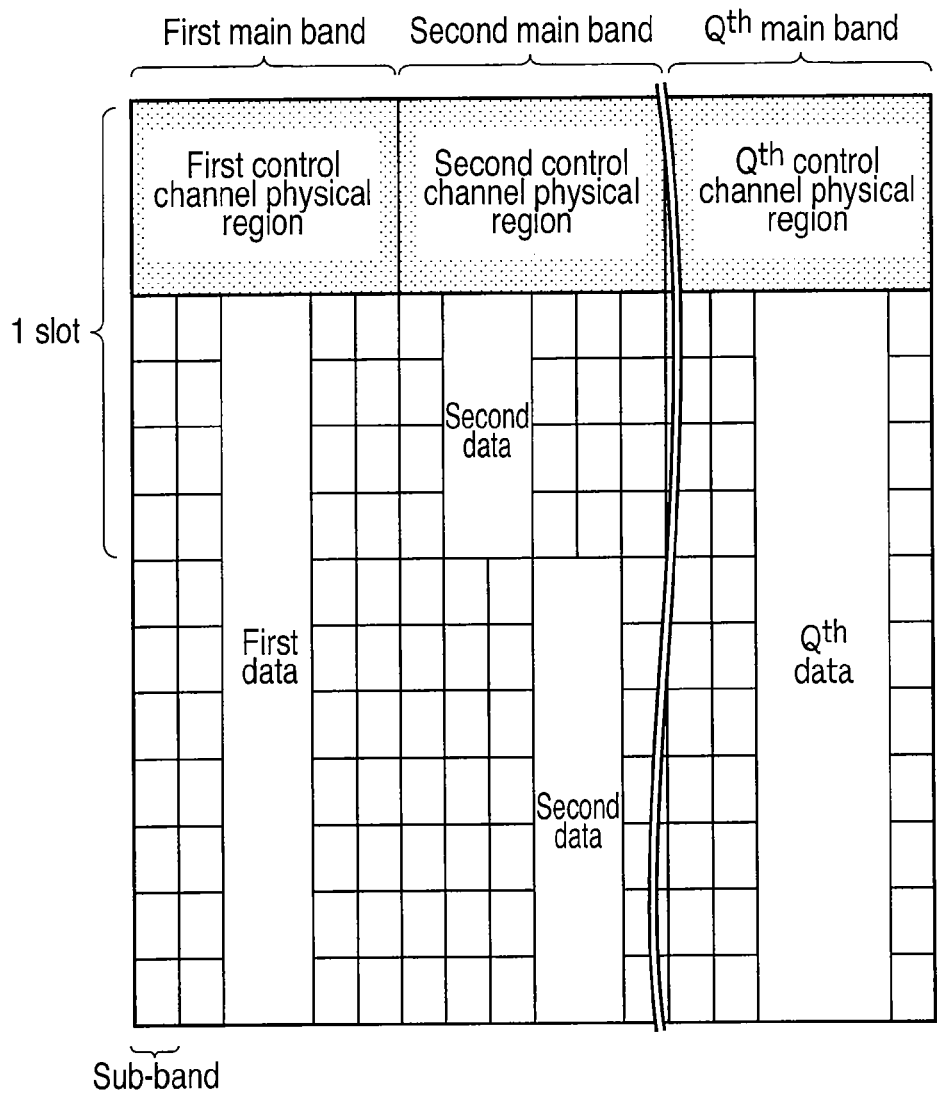
FIG. 5 a view illustrating data mapping employed in the communication system of FIG. 1.

FIG. 5 two-dimensionally shows the above-described structures in frequency and time domains. In FIG. 5, the vertical axis represents time elapsing from top to bottom, and the horizontal axis represents frequency increasing from left to right. Assume that the leading three OFDM symbols of one sub-frame are set as a control channel physical region. The control channel physical region in the first main band will hereinafter be referred to as the first control channel physical region. Similarly, the control channel physical region in the second main band will hereinafter be referred to as the second control channel physical region. Further, assume that the control channel physical region is set up to the $Q^{th}$ control channel physical region in the $Q^{th}$ main band, and that the base station transmits a control channel to each terminal using the control channel physical region. For instance, the control channel corresponding to a terminal is included in one or more main bands. The control channel will be described later with reference to FIG. 6. The region ranging from the fourth OFDM symbol to the last OFDM symbol of the second slot is allocated to user data to transmit. Assume that it is not always necessary to use all sub-bands of a main band for the user data. Namely, the user data may be transmitted using part of the sub-bands.

In the case shown in, for example, FIG. 5, user data is transmitted using the third and fourth sub-bands of the first main band. The user data transmitted via the first main band will hereinafter be referred to as first data. Further, regarding user data transmitted via the second main band, the second and third sub-bands are used in the first slot, and the fourth and fifth bands are used in the second slot. Thus, different sub-bands may be used between the first and second slots. The user data transmitted via the second main band will hereinafter be referred to the second data. User data is transmitted via the third to $Q^{th}$ main bands in a manner similar to the above.

Figure 6:
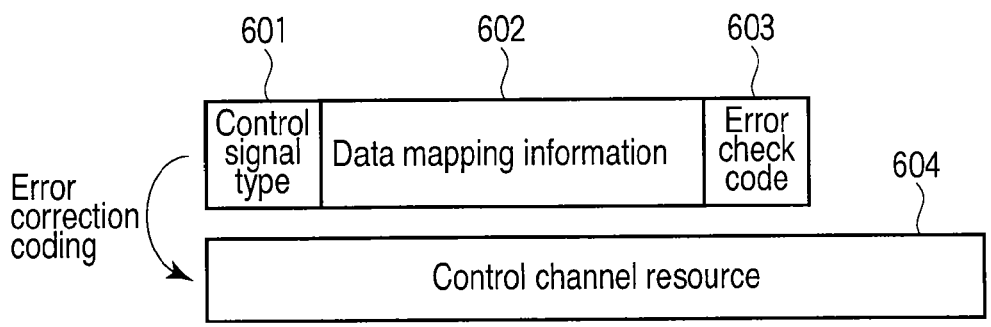
FIG. 6 is a view illustrating control information and a control channel resource used in the communication system of FIG. 1.

Referring now to FIG. 6, a control channel included in the control channel physical region shown in FIG. 5 will be described. The upper portion of FIG. 6 shows control information, and the lower portion shows a control channel resource 604 as a logical resource.

Plural types of control information 602 can be transmitted by a control channel. In the first embodiment, however, the control information is supposed to be one data item sent to one user and indicating downlink sub-bands in which user data is mapped. Other types of control information can exist, which indicates sub-bands used in the uplink or the transmission power control of the uplink. To identify the type of the control information, data 601 indicating the type of the control signal is attached to the leading end of the control information, as is shown in FIG. 6.

Definitions will be given of the terms used in the first embodiment. The control information indicates in which sub-band(s) subsequent data is mapped. The control channel is a physical transmission signal obtained by modulating the control information. The control channel resource is the range designated by time and frequency and used for transmitting the control channel. The control channel resource can be referred to as a logical resource and also as a physical resource. The logical resource means a range corresponding to one or more transmission bits and used to hold the control information, while the physical resource means an OFDM subcarrier in which transmission bits are mapped after they are modulated. The logical resource and the physical resource can be also referred to as a communication resource.

Subsequent to the leading portion of the control information, downlink user data allocation information (also called data mapping information 602) according to the first embodiment is provided. The allocation information indicates the sub-band(s) in each main band, by which user data is transmitted. Namely, the example of FIG. 5 indicates that the first control channel transmitted via the first control channel physical region is transmitted by the second and third sub-bands.

Subsequent to the allocation information, an error check code 603 for detecting a transmission error is provided. Although in the first embodiment, a CRC code is used as the error check code, an error check code other than the CRC code may be used.

The control information 602 is subjected to error correction coding to cope with noise or distortion in radio transmission. For instance, the control information is made redundant and large in size by error correction coding such as convolutional coding. Further, the control information is subjected to scrambling unique to each user. In addition to the first control channel, a second control channel transmitted via the second control channel physical region, up to a $Q^{th}$ control channel transmitted via the $Q^{th}$ control channel physical region, exist.

Figure 7:
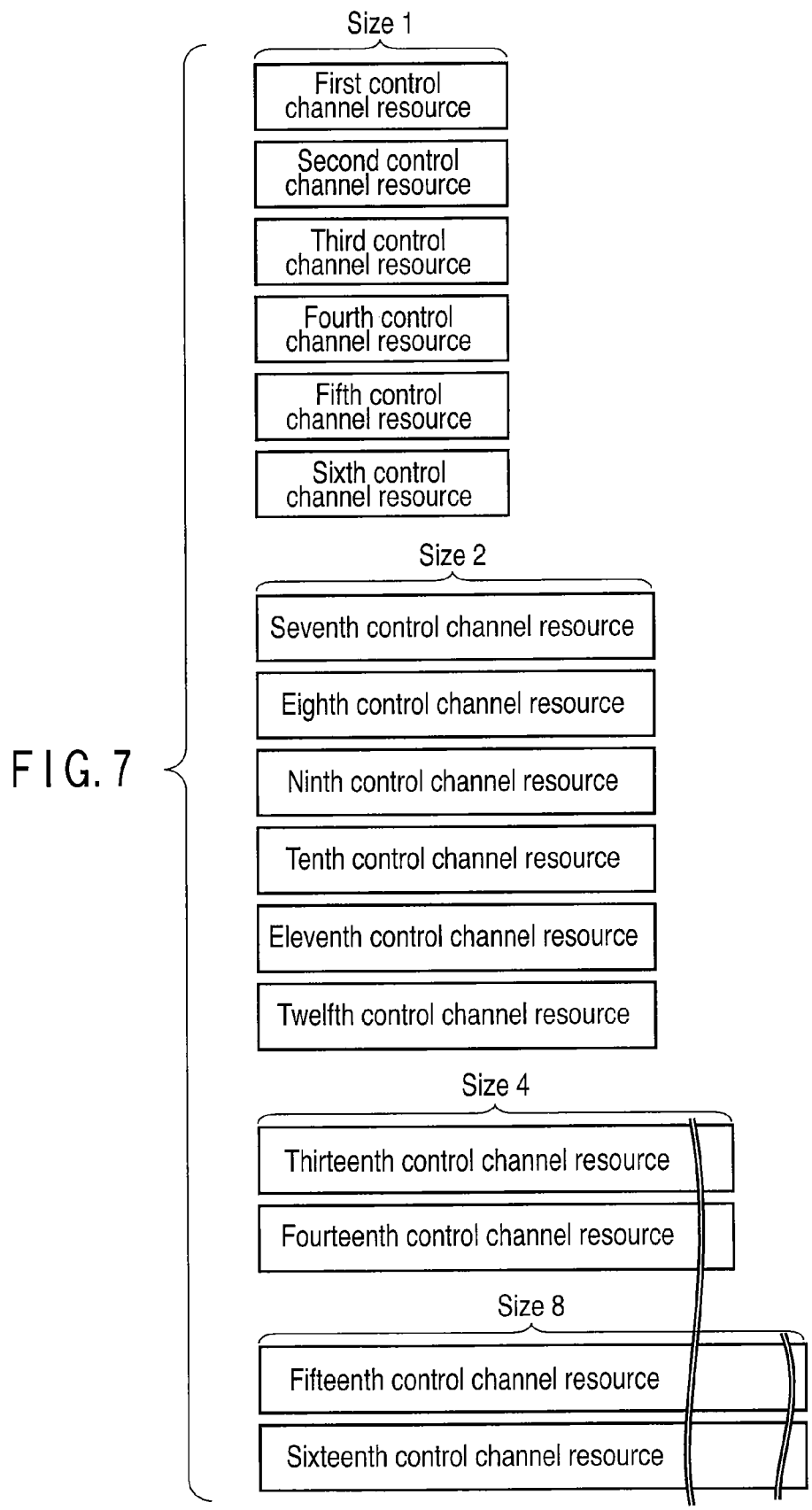
FIG. 7 is a view illustrating a control channel resource structure employed in the first embodiment.

Referring then to FIG. 7, a description will be given of the control channel resource that is included in each control channel logical region of each control channel physical region. FIG. 7 shows the logical control channel resource structure of each control channel logical region. Namely, FIG. 7 shows the logical resource. When transmitting control information using a certain control channel, a logical resource is converted into a physical resource designated by time and frequency, and the resultant physical resource is utilized. In the descriptions below, the "resource" will mean "logical resource" if not otherwise specified.

In the system according to the embodiment, the terminals 101 to 104 are positioned at different distances from the base station 105. For a terminal at a short distance from the base station, it is desirable to minimize wasteful use of resources by suppressing the redundancy of error correction coding executed when a control channel is generated, thereby reducing the size of the required resources to the degree at which no transmission errors will occur. In contrast, for a terminal at a long distance from the base station, it is necessary to increase the redundancy to prevent transmission errors and realize reliable transmission.

As described above, when control information is transmitted, it is desirable to vary the redundancy of error correction coding in accordance with the distance between the base station and a user terminal. To this end, a plurality of sizes are set for the logical control channel resources for transmitting the control information. In FIG. 7, to clarify the size differences of the control channel resources, the control channel resources are symbolically shown different in size as their sizes differ. In the shown case, four sizes are prepared, i.e., size 1 as a reference size, size 2 that is twice size 1, size 4 that is four times size 1, and size 8 that is eight times size 1. Since the physical control channel resources correspond to the respective logical control channel resources, four sizes are also set for the physical control channel resources. However, if a large number of control channel resources of such a great size as size 8 are secured, the control channel physical resources may run short. Therefore, assume here that there are provided six control channel resources of size 1, six control channel resources of size 2, two control channel resources of size 4, and two control channel resources of size 8. The base station maps control information in one or more of the sixteen control channel resources (logical resources). At this time, since in one control channel physical region, one control channel is set for one user, overlapping use of the same control channel resource should be avoided when control channels are sent to a plurality of users.

In the receiving process of a target receiving apparatus, when demodulating a control channel addressed thereto, it is necessary to detect which channel resource is used by the base station to transmit the control channel. However, if the information allocated to the control channel is separately transmitted, a further communication resource is required, and hence the separate transmission is undesirable. The target receiving apparatus of the embodiment demodulates the control channel resources one by one, and determines that the control channel resource, in which the error check code is correctly demodulated, is addressed thereto. Since the control channel addressed to the target receiving apparatus is beforehand subjected to scrambling using a scrambling sequence assigned to the receiving apparatus, if the apparatus descrambles the control channel, it can correctly demodulate the same. In contrast, information addressed to another terminal is scrambled using a different scrambling sequence. Accordingly, even if the target receiving apparatus descrambles this information using the scrambling sequence assigned thereto, it cannot correctly demodulate the information. The above-mentioned detection method will be hereinafter referred to as blind detection of a control channel. In the embodiment, demodulation must be repeated sixteen times at the maximum for blind detection.

Figure 8:
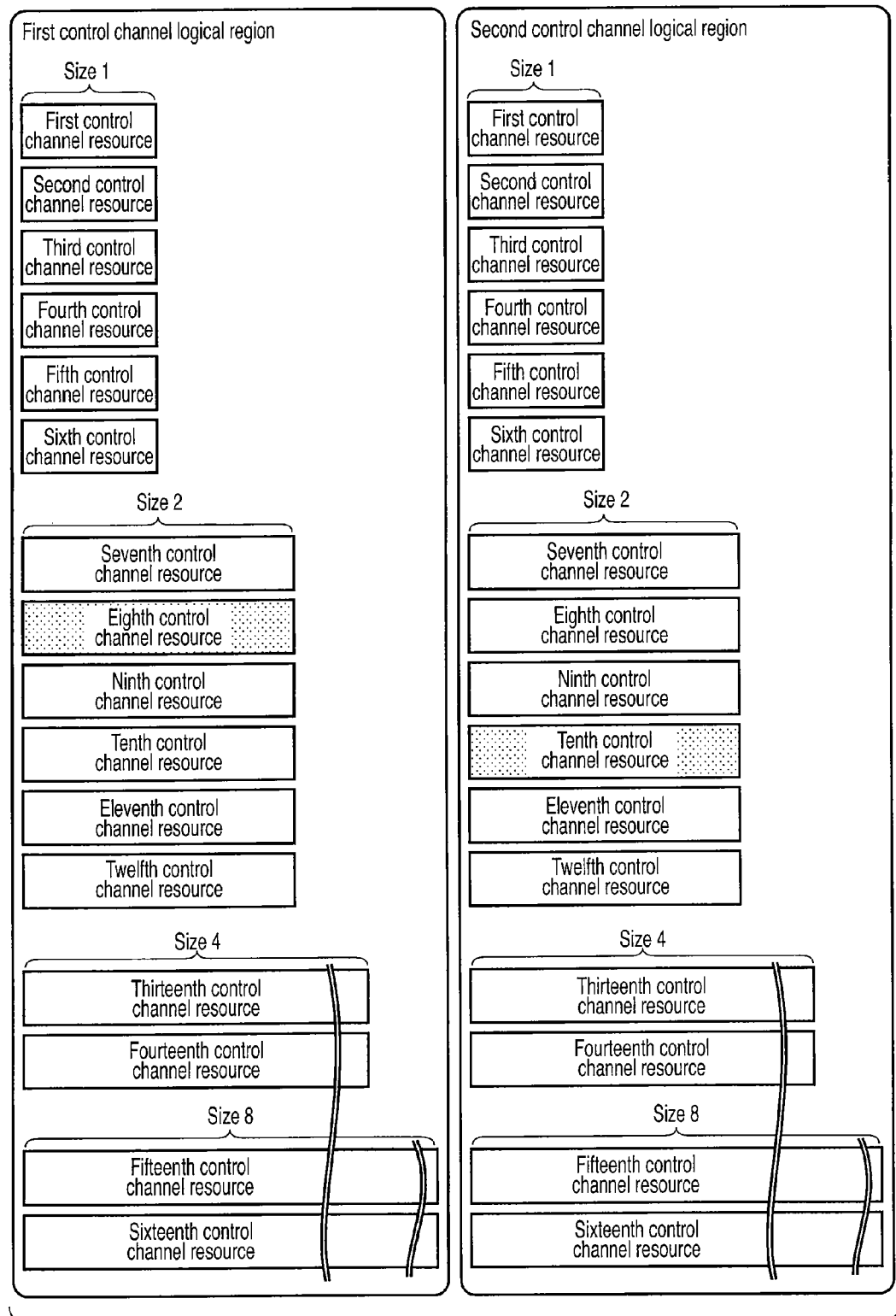
FIG. 8 is a view illustrating examples of control channel resource groups (logical resource groups) employed in the first embodiment, each of the control channel resource groups having the same size.

Referring to FIG. 8, a first method for reducing the number of times of demodulation for blind detection will be described. FIG. 8 shows control channel resources in the first and second control channel logical regions.

Firstly, a problem will be revealed. First control information included in one of the control channel resources of the first control channel logical region must indicate a sub-band (or sub-bands) which is included in the first main band and in which the first data is mapped. Similarly, second control information included in one of the control channel resources of the second control channel logical region must indicate where in the second main band the second data is mapped. If the control channel resource in the first control channel logical region, in which the first control information is mapped, and the control channel resource in the second control channel logical region, in which the second control information is mapped, can be set independently, the receiving apparatus must execute blind detection twice in the first and second control channel logical regions to receive the respective control channels. Assume, for instance, that the transmitting apparatus maps the first and second control information in eighth and tenth channel resources, respectively. To detect the sub-band included in the first main band and used for the first data, the receiving terminal must detect control information, addressed thereto, by blind detection in the first control channel logical region. At this time, demodulation must be attempted sixteen times at the maximum. Similarly, it must execute blind detection to detect control information addressed thereto in the second control channel logical region. Also at this time, demodulation must be attempted sixteen times at the maximum. This is very inefficient.

However, in the first embodiment, consideration is given to the association of the control channel resource of the first control channel logical region, in which the first control information is mapped, with the control channel resource of the second control channel logical region, in which the second control information is mapped.

For example, a rule that control channel resources of the same size should be chosen as far as possible is beforehand determined. Firstly, the terminal must search the first control channel logical region for the first control information by blind detection. If it is detected that the first control information is in the eighth control channel resource of size 2, it is sufficient if blind detection in the second control channel logical region is started from a control channel resource of size 2. For instance, when demodulation is sequentially attempted beginning with a seventh control channel resource, the second control information can be detected in the fourth demodulation in which a tenth control channel resource is demodulated. Thus, the control channel resources are restricted by setting such a rule as the above. If no rule is set, the terminal starts demodulation from the first control channel resource, and may execute demodulation ten times until detecting the second control information in the tenth control channel resource. In the embodiment, since a rule concerning the relationship between the control channel logical regions is made as mentioned above, the time and labor required for blind detection can be reduced.

Figure 9:
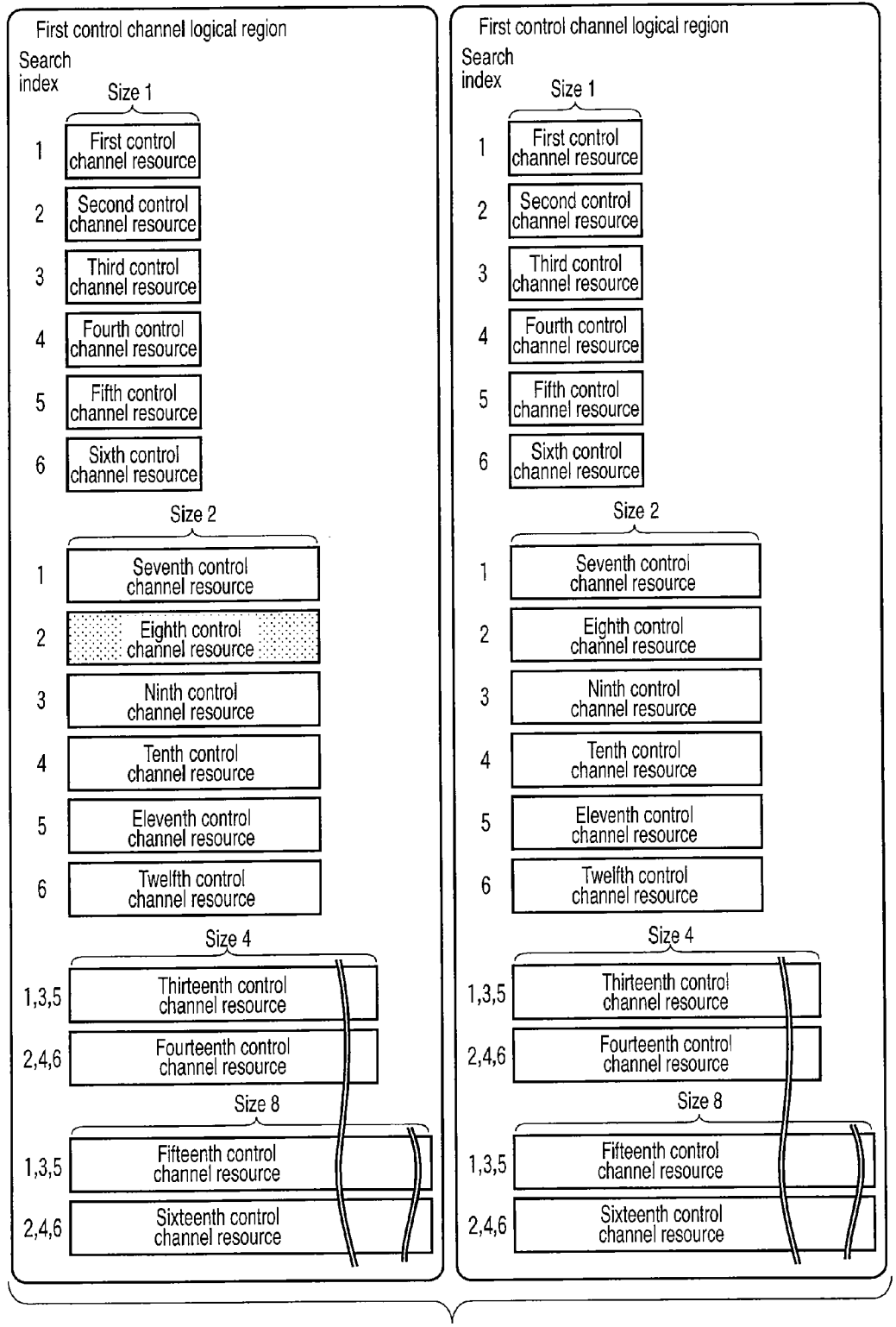
FIG. 9 is a view illustrating examples of control channel resource groups (logical resource groups) employed in the first embodiment, each of the control channel resource groups having the same index number.

Referring then to FIG. 9, a second method for reducing the number of times of demodulation for blind detection will be described. FIG. 9 is a view useful in explaining another rule of setting control channel resources used by control information transmitted via each control channel logical region. In the example of FIG. 9, numbers called search indexes are beforehand attached to the control channel resources. The search indexes are assigned to respective control channel resources of the same size.

If the eighth control channel resource of the first control channel logical region is used, the control channel resources included in the second control channel logical region and having the same search index, i.e., the control channel resources with index number 2, are used preferentially to transmit a control channel. After the receiving terminal detects by blind detection that the control information addressed thereto has been transmitted via the eighth control channel resource of the first control channel logical region, it starts searching, in the second main band, the second control channel resource with index number 2, the eighth control channel resource with index number 2, the fourteenth control channel resource with index number 2, and the sixteenth control channel resource with index number 2, in the order mentioned. As a result, the terminal can quickly detect the second control information stored in the second control channel resource.

Referring then to FIG. 10, a description will be given of a third method for reducing the number of times of demodulation for blind detection. FIG. 10 shows a case which employs a rule that the control channel resource used in the first control channel logical region is made to be the same as that in the second control channel logical region as far as possible. In this case, in the first and second control channel logical regions, the same eighth control channel resources are used. When such a rule as this is predetermined, after the control channel resource used in the first control channel logical region is detected by blind detection, if the eighth control channel resource is demodulated at first, the second control information can be detected.

In the above-mentioned rule, it is requested that the rule should be followed as far as possible. Since each control channel physical region includes a plurality of control channels directed to a plurality of users, a target control channel resource may be already used to transmit a control channel to another user. In this case, the base station does not necessarily have to follow the rule, but may use any arbitrary free control channel resource. Although the receiving apparatus attempts, in blind detection, to preferentially demodulate control information in the control channel resource determined under the rule, it shifts demodulation of control information in another control channel resource if no target information is detected in the determined control channel resource.

Figure 11:
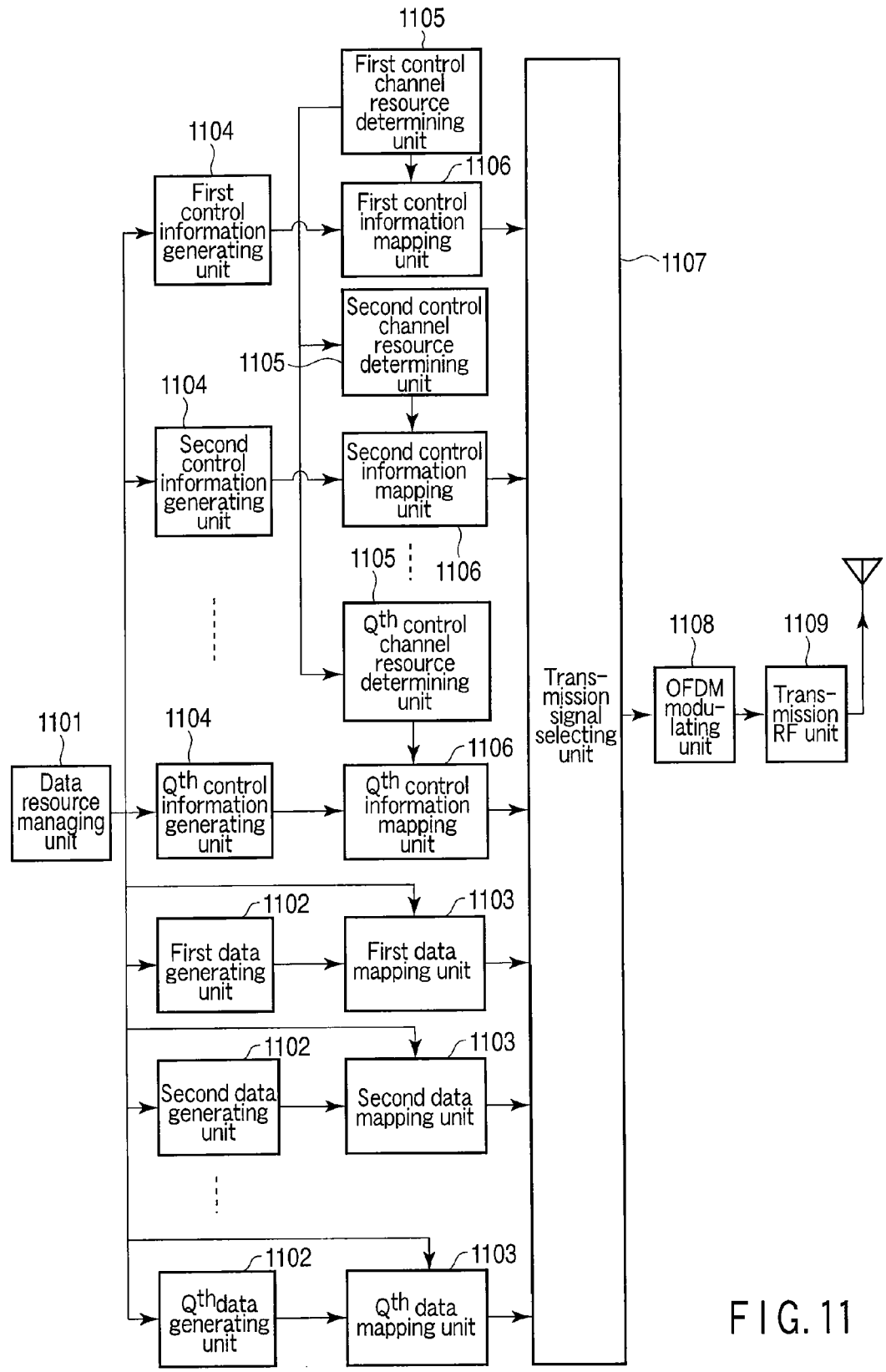
FIG. 11 is a block diagram illustrating a transmitting apparatus employed in the first embodiment.

Referring to FIG. 11, the transmitting apparatus of FIG. 2 will be described. FIG. 11 shows the structure of the transmitting apparatus according to the first embodiment.

When user data to be transmitted occurs, a data resource managing unit 1101 sets sub-bands in the respective main bands, in which the user data is mapped. More specifically, it determines the user data to be transmitted via each main band, the number of the sub-bands needed in each main band, and allocation of the sub-bands in each main band. The allocation information is sent to first to $Q^{th}$ data generating units 1102, first to $Q^{th}$ data mapping units 1103, and first to $Q^{th}$ control information generating units 1104.

The first data generating unit 1102 generates first data to be transmitted via the first main band. More specifically, the first data generating unit 1102 extracts and modulates the part of the user data to be transmitted via the first main band. As the modulation scheme, QPSK, 16 QAM, 64 QAM modulation schemes, for example, can be used. It is a matter of course that the modulated first data must have a size which permits the data to be contained in the corresponding sub-band(s) reported by the data resource managing unit 1101. The thus-generated first data is sent to the first data mapping unit 1103.

The first data mapping unit 1103 maps, in the corresponding sub-band(s), the first data sent from the first data generating unit 1102. Actually, the mapping unit maps the first data in the subcarrier(s) corresponding to the sub-band(s). The portion(s) of mapping is indicated by the data resource managing unit 1101. The signal generated by the first data mapping unit 1103 is sent to a transmission signal selecting unit 1107.

The second to $Q^{th}$ data generating units 1102 operate in the same way as the first data generating unit 1102, except that their generation targets are second to $Q^{th}$ data. Further, the second to $Q^{th}$ data mapping units 1103 operate in the same way as the first data mapping unit 1103, except that their mapping targets are second to $Q^{th}$ main bands.

The first control information generating unit 1104 generates first control information based on first data mapping sub-band information sent for the first main band from the data resource managing unit 1101. The control information transmitted by a control channel has such a structure as shown in FIG. 6, and indicates the sub-band(s) in which the first data is mapped. The control information generated by the first control information generating unit 1104 is sent to a first control information mapping unit 1106.

A first control channel resource determining unit 1105 determines which one of the sixteen control channel resources included in the first control channel logical region should be used to transmit first control information. At this time, considering that the first control channel region is also used to transmit a first control channel to another terminal, the determining unit 1105 selects a control channel resource that differs from the control channel resource used to transmit the channel to said another terminal. Information indicating the selected control channel resource is sent to the first control information mapping unit 1106. This information is also sent to the second to $Q^{th}$ control channel resource determining unit 1105.

The first control information mapping unit 1106 maps the first control information, generated by the first control information generating unit 1104, to the control channel resource determined by the first control channel resource determining unit 1105. The mapping operation includes modulating the first control information, and mapping each modulated symbols to the first control channel physical region corresponding to the first control channel logical region, i.e., to each subcarrier in the leading three OFDM symbols. The mapping result is reported to the transmission signal selecting unit 1107. Thus, the control information is converted into a control channel.

The second to $Q^{th}$ control information generating units 1104 operate in the same way as the first control information generating unit 1104, except that their generation targets are the second to $Q^{th}$ control information, and their output destinations are the second to $Q^{th}$ control information mapping units 1106.

The second control channel resource determining unit 1105 operates differently from the first control channel resource determining unit 1105. The first control channel resource determining unit 1105 selects the control channel resource that does not contain first control information to be transmitted to another terminal. In addition to this, the second control channel resource determining unit 1105 restricts the range of control channel resources to satisfy the rule of selecting, from the second control channel logical region, a control channel resource having the same number as the control channel resource provided with the first control information, or of selecting therefrom the control channel resources having substantially the same size or the same index number, thereby selecting one of the limited control channel resources. If these rules are not satisfied, a control channel resource different from the control channel resource used to transmit second control information to another terminal is selected. The selection result is reported to the second control information mapping units 1106.

The third to $Q^{th}$ control channel resource determining units 1105 operate in the same way as the second control channel resource determining unit 1105, except that they process the third to $Q^{th}$ control information, and their output destinations are the third to $Q^{th}$ control information mapping units 1106. In the first embodiment, the first control channel resource determining unit 1105 operates differently from the second to $Q^{th}$ control channel resource determining units 1105. Alternatively, one of the first to $Q^{th}$ control channel resource determining units 1105 may determine the control channel resource like the first control channel resource determining unit 1105, and thereafter, the other control channel resource determining units 1105 may receive the determined control channel resource and operate like the second control channel resource determining unit 1105.

The second to $Q^{th}$ control information mapping units 1106 operate in the same way as the first control information mapping unit 1106, except that they receive the signal output from the second to $Q^{th}$ control information generating units 1104 and the second to $Q^{th}$ control channel resource determining units 1105.

The transmission signal selecting unit 1107 selects a control channel or user data, to be transmitted, in accordance with the point of time, and outputs the selection result to an OFDM modulating unit 1108. As described above referring to FIG. 5, the leading three OFDM symbols of each sub-frame are used to transmit a control channel, and the subsequent signal components are used to transmit user data.

The OFDM modulating unit 1108 subjects, to OFDM modulation, the signal output from the transmission signal selecting unit 1107, adds a cyclic prefix to the signal, and outputs the resultant signal to a transmission RF unit 1109.

The transmission RF unit 1109 converts the OFDM-modulated baseband signal into an analog signal, then converts the analog signal to a transmission RF signal, and outputs the resultant signal to a transmission antenna. The transmission antenna transmits the transmission RF signal received from the transmission RF unit 1109.

Referring to FIG. 12, the operation of the transmitting apparatus shown in FIG. 11 will be described.

In the transmitting apparatus, upon starting processing, the data resource managing unit 1101 determines a sub-band (sub-bands) included in each main band and used to transmit user data (determination of transmission sub-bands) (step S1201). This transmission sub-band determination process is executed for each main band.

The subsequent process includes a process associated with control information and a process associated with data. In the process associated with control information, it is firstly determined whether a control channel resource, which has the same number as the control channel resource used in the main band that is adjacent to a target main band and has a lower frequency range than the target main band, can be used in the target main band (step S1202). This determination is executed by the first to $Q^{th}$ control channel resource determining units 1105. When a control channel resource is to be determined in the first main band, the answer to step S1202 is No, since any control channel resource is not yet used in the adjacent main band. When the control channel resource is determined in a main band (target main band) other than the first main band, it is necessary to confirm the control channel resource setting status of the main band that is adjacent to the target main band and has a lower frequency range than the target main band, to determine whether a control channel resource having the same number as the control channel resource used in the adjacent main band can be used in the target main band. If the answer to step S1202 is Yes, the target control channel resource is set as a control channel transmission resource (step S1203), and the process proceeds to control information generation processing at step S1209. In contrast, if the answer to step S1202 is No, the process proceeds to the subsequent determination step S1204.

At step S1204, the control channel resource setting status of the adjacent main band is confirmed to determine whether a control channel resource having the same size as the control channel resource used in the adjacent main band can be used in the target main band. This determination is executed by the first to $Q^{th}$ control channel resource determining units 1105. When a control channel resource is to be determined in the first main band, the answer to step S1204 is No, since any control channel resource is not yet used in the adjacent main band. If the answer to step S1204 is Yes, the target control channel resource is set as a control channel transmission resource (step S1205), and the process skips to step S1209. In contrast, if the answer to step S1204 is No, the process proceeds to subsequent step S1206.

At step S1206, the control channel resource setting status of the adjacent main band is confirmed to determine whether a control channel resource having the same index number as the control channel resource used in the adjacent main band can be used in the target main band. This determination is executed by the first to $Q^{th}$ control channel resource determining units 1105. When a control channel resource is to be determined in the first main band, the answer to step S1206 is No, since any control channel resource is not yet used in the adjacent main band. If the answer to step S1206 is Yes, the target control channel resource is set as a control channel transmission resource (step S1207), and the process skips to step S1209. In contrast, if the answer to step S1206 is No, the process proceeds to subsequent step S1208 for setting an available control channel resource.

In the process of setting the available control channel resource, a control channel resource, which is not used to transmit control information to another user, is determined. This determination is executed by the first to $Q^{th}$ control channel resource determining units 1105.

In the control channel generating process, control information indicating a sub-band (sub-bands) that is included in each main band for user data transmission and is determined by the data resource managing unit 1101. This process is executed by the first to $Q^{th}$ control information generating units 1104 (step S1209). After that, control information is mapped to the control channel resources determined in the above-mentioned process (step S1210). This process is executed by the first to $Q^{th}$ control information mapping units 1106. This is the end of the processes associated with the control information.

Subsequently, in the data transmission process, transmission user data is generated for the sub-bands determined by the data resource managing unit 1101 (step S1211), and is then mapped (step S1212). These processes are executed by the first to $Q^{th}$ data generating units 1102 and the first to $Q^{th}$ data mapping units 1103. This is the end of the processes associated with the user data.

Referring then to FIG. 13, the receiving apparatus of the embodiment will be described.

A receiving RF unit 1301 is supplied with an RF signal received by the receiving antenna, and converts the signal into a digital baseband signal. An OFDM demodulating unit 1302 demodulates the digital baseband signal to extract receiving symbols from the subcarriers of the signal. Based on time information, a receiving process selecting unit 1303 determines whether the receiving symbols of the subcarriers should be sent to first to $Q^{th}$ control channel demodulating units 1304 or to first to $Q^{th}$ data demodulating units 1305. Since the leading three OFDM symbols of each sub-frame represents control information, they are sent to the first to $Q^{th}$ control channel demodulating units 1304. Further, the signal components subsequent to the $Q^{th}$ leading three OFDM symbols are sent to the first to data demodulating units 1305.

The first control channel demodulating unit 1304 converts each control channel resource as a physical resource into a logical resource, then executes blind detection of the control information in the first control channel logical region to thereby sequentially extract signals from the sixteen control channel resources included in the logical region, and demodulates the signals in order to detect the signal in which the error check code is correctly decoded. If detected, the signal is determined to indicate the control information addressed to the receiving application, and the information included in the control information and indicating the sub-band(s) with the first data mapped therein is sent to a first data demodulating unit 1305.

The second control channel demodulating unit 1304 also has a function of executing blind detection on the second control channel logical region to detect and demodulate control information. The second control channel demodulating unit 1304 is also connected to the first control channel demodulating unit 1304 to exchange control channel resource detection information therewith. The second control channel demodulating unit 1304 receives, from the first control channel demodulating unit 1304, the information indicating the control channel resource with the detected first control information. Upon receiving the information, the second control channel demodulating unit 1304 attempts to demodulate the control channel resource having the same number as the control channel resource indicated by the information. If second control information is detected therein, the information included in the second control information and indicating second data mapping is sent to a second data demodulating unit 1305. If no second control information is detected, the second control channel demodulating unit 1304 sequentially attempts to demodulate the control channel resources having the same size as the control channel resource indicated by the information. If no second control information is detected, the second control channel demodulating unit 1304 sequentially attempts to demodulate the control channel resources having the same index number as the control channel resource indicated by the information. If no second control information is still detected, the second control channel demodulating unit 1304 attempts to demodulate the other control channel resources.

Third to $Q^{th}$ control channel demodulating units 1304 operate in the same way as the second control channel demodulating unit 1304, except that their detection targets are the third to $Q^{th}$ control channel logical regions, respectively, and that their output destinations are the third to $Q^{th}$ data demodulating units 1305, respectively. In the first embodiment, the first control channel demodulating unit 1304 operates differently from the second to $Q^{th}$ control channel demodulating units 1304. Alternatively, one of the first to $Q^{th}$ control channel demodulating units 1304 may sequentially demodulate, like the first control channel demodulating unit 1304, the control channel resources in order to detect the signal in which the error check code is correctly decoded, and after that, the other control channel demodulating units 1304 may receive the information indicating the control channel resource in which the signal is detected, and operate in the same way as the second control channel demodulating unit 1304.

As described above, the time and labor required for blind detection can be reduced by sharing information for detecting control information between the first to $Q^{th}$ control channel demodulating units 1304.

The first data demodulating unit 1305 detects and demodulates first data in the sub-band(s) designated by the first control channel demodulating unit 1304. The second to $Q^{th}$ data demodulating units 1305 operate in the same way as the first data demodulating unit 1305, except that they receive signals from the second to $Q^{th}$ data control channel demodulating units 1304, and that their demodulation targets are the second to $Q^{th}$ main bands.

Figure 14:
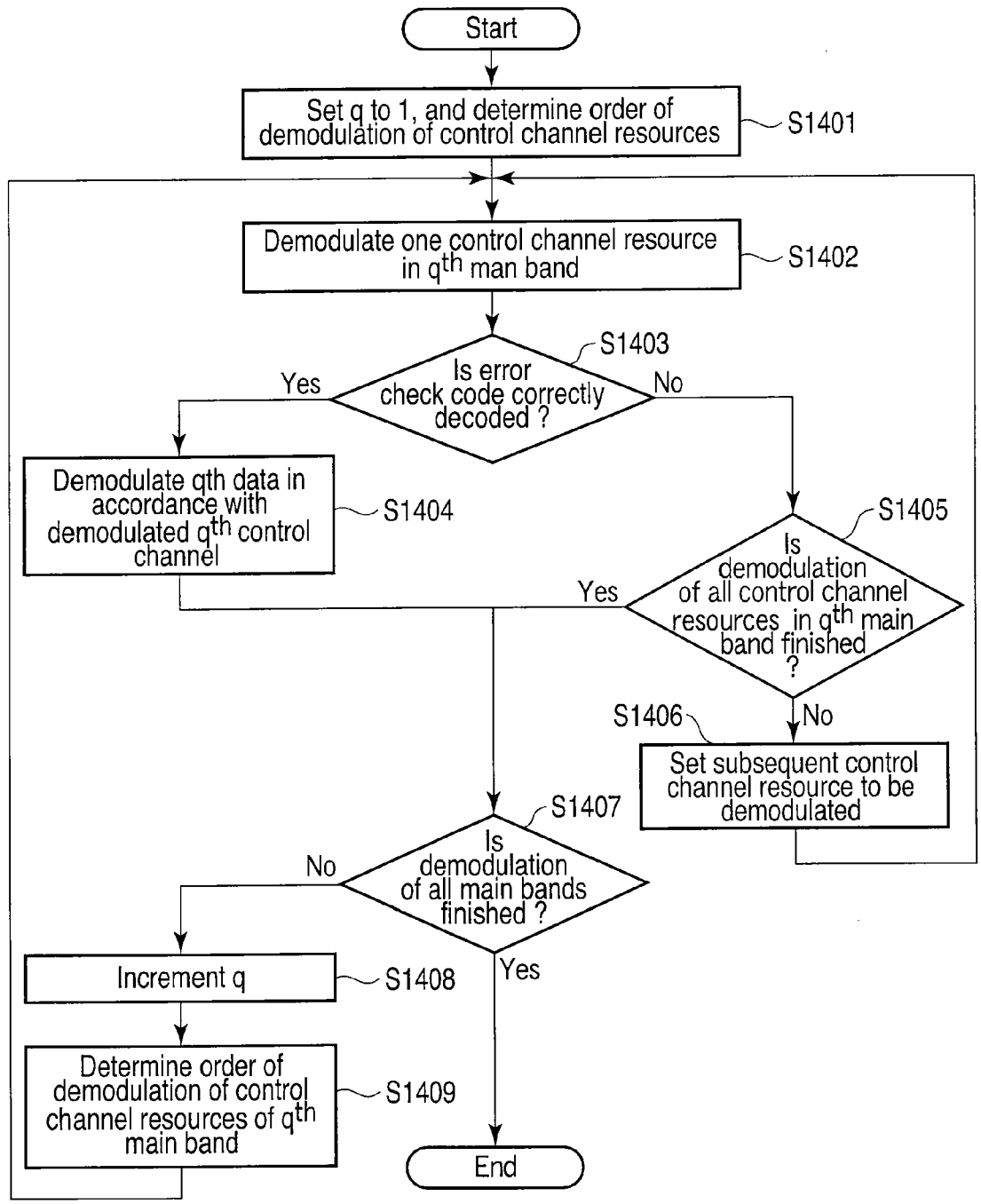
FIG. 14 is a flowchart useful in explaining an operation example of the receiving apparatus shown in FIG. 13.

Referring to FIG. 14, the operation of the receiving application shown in FIG. 13 will be described.

Upon starting processing, the receiving apparatus sets, to 1, q indicating a main band, and at the same time determines the order of demodulation of the sixteen control channel resources included in the first control channel logical region (step S1401). In a simplest case, the first to 16th control channel resources are sequentially demodulated in the increasing order. This process is executed by the first control channel demodulating unit 1304.

Subsequently, the first one of the control channel resources included in the first main band is demodulated (step S1402), and is subjected to an error check code checking process (step S1403). This process is also executed by the first control channel demodulating unit 1304. If the result of the error check code checking indicates correct demodulation, the sub-band(s) defined by the first control channel resource is demodulated (step S1404) to obtain first data, whereby the processing of the first main band is terminated. This process is executed by the first data demodulating unit 1305.

If the result of checking indicates incorrect demodulation, another control channel resource is attempted to be demodulated. The above processing is iterated until the first control information is detected, or demodulation of all control channel resources is finished. This is the termination of the processing on the first main band (steps S1405 and S1406).

After finishing the processing on the first main band, it is determined whether demodulation of all main bands is finished (step S1407). At this time, the answer to step S1407 is, of course, No, and hence q is incremented (step S1408), the same processing as the above is executed on the adjacent second main band (steps S1409 and S1402 to S1407). Based on the information indicating the control channel resource in the first control channel logical region, in which the first control information has been detected, the order of demodulation of the sixteen control channel resources in the second control channel logical region is determined. Subsequently, the control channel resources in the second control channel logical region are started to be demodulated one by one.

The above processing is executed on all main bands.

In the above-described first embodiment, when plural bands are simultaneously used, second logical resources that are included in the second transmission band and may be used to transmit second control information are restricted in accordance with the number assigned to the first logical resource of the first transmission band used to transmit first control information, and one of the restricted second logical resources is selected. This process facilitates the detection of control information and reduces the load required for blind detection.

Second Embodiment

In a second embodiment, the first embodiment is expressed in detail using arithmetic expressions.

Assume here that the control channel resources in the $k^{th}$ sub-frame of the $q^{th}$ main band are part of all control channel resource elements, i.e., $N_{CCE, q, k}$ control channel resource elements, and that a control channel resource of size 1 comprises one control channel resource element, control channel resources of sizes 2, 4 and 8 comprise 2, 4 and 8 control channel resource elements, respectively.

The control channel resource to be monitored by the terminal is defined as a search space. The search space $S^{(L)}_{q,j,k}$ of a control channel resource of size $Lq \in \{1, 2, 4, 8\}$ in the $q^{th}$ main band is defined by continuous control channel resource elements given by the following expression:

$$(Z^{(Lq)}_{q,k} + L_q j_{q,Lq} + i) \bmod N_{CCE_q,k}$$

where $Z^{(Lq)}_{q, k}$ represents the start position of the initial control channel resource of each size, and $j_{q, Lq}$ represents the $j^{th}$ control channel resource of each size. Assume that sizes 1 and 2 satisfy $j_{q, Lq} \in \{0, 1, \ldots, 5\}$ and sizes 4 and 8 satisfy $j_{q, Lq} \in \{0, 1\}$, and $i=0, 1, \ldots, L-1$. $Z^{(Lq)}_{q, k}$ is determined using a user ID as well as q, k and Lq.

The terminal sequentially demodulates the control channel resources represented by the combinations of Lp and $j_{q, Lq}$. Specifically, demodulation is executed as follows:

1. When it is already known that Lq' and $j_{q', Lq'}$ are used in the $q'^{th}$ main band, the control channel resource represented by Lq=Lq' and $j_{q, Lq} = j_{q', Lq'} \bmod \{\max (j_{q, Lq})\}$ is demodulated.

2. When it is already known that Lq' is used in the $q'^{th}$ main band, each control channel resource represented by Lq=Lq' is demodulated.

3. When it is already known that $j_{q', Lq'}$ is used in the $q'^{th}$ main band, each control channel resource represented by $j_{q, Lq} = j_{q', Lq'} \bmod \{\max (j_{q, Lq})\}$ is demodulated.

4. Each control channel resource that is not yet demodulated is demodulated.

In the above-described second embodiment, if a control channel resource used in a certain main band is already known, control channel resource searching in another main band is facilitated, as in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitting apparatus comprising:
a transmitting unit configured to transmit first control information using one of first communication resources, the first communication resources being included in a first transmission band and having respective independent numbers, and to transmit second control information using one of second communication resources, the second communication resources being included in a second transmission band and having respective independent numbers; and
a selecting unit configured to restrict the second communication resources to restricted second communication resources in accordance with a number assigned to one of the first communication resources used to transmit the first control information, and to select one second communication resource from the restricted second communication resources,
the transmitting unit transmitting the second control information using the selected second communication resource.

2. The apparatus according to claim 1, wherein the restricted second communication resources have a same size as one first communication resource used to transmit the first control information.

3. The apparatus according to claim 1, wherein
if the second communication resources include a certain second communication resource that has a same number as one first communication resource used to transmit the first control information and is available, the selecting unit selects the certain second communication resource;
if the certain second communication resource is unavailable and if the second communication resources include another second communication resource that has a same size as the one first communication resource and is available, the selecting unit selects the another second communication resource;
if the certain second communication resource is unavailable, if the another second communication resource is unavailable, and if yet another second communication resource that has a same number as the one first communication resource and is available is included in second communication resources having a same size as the one first communication resource, the selecting unit selects the yet another second communication resource; and
if the certain second communication resource is unavailable, if the another second communication resource is unavailable and if the yet another second communication resource is unavailable, the selecting unit selects one of remaining second communication resources that are not subjected to a determination as to whether the remaining second communication resources are available.

4. A receiving apparatus for receiving the first control information and the second control information as recited in claim 3, comprising:
a first demodulating unit configured to sequentially attempt, until demodulation succeeds, to demodulate signals received via first communication resources included in a first transmission band, to acquire the first control information; and
a second demodulating unit configured to demodulate signals received via second communication resources included in a second transmission band, to acquire the second control information, wherein the second demodulating unit attempts to demodulate, to acquire the second control information, a signal received via one of the second communication resources that has a same number as one of the first communication resources used to receive the first control information;

if the second control information is not acquired from the signal received via one second communication resource that has a same number as one of the first communication resources used to receive the first control information, the second demodulating unit attempts to demodulate, to acquire the second control information, a signal received via another of the second communication resources that has a same size as one first communication resource used to receive the first control information;

if the second control information is not acquired from the signal received via another second communication resource that has a same size as the one first communication resource used to receive the first control information, the second demodulating unit attempts to demodulate, to acquire the second control information, a signal received via yet another of the second communication resources that has a same number as the one first communication resource; and if the second control information is not acquired from the signal received via the yet another second communication resource, the second demodulating unit sequentially attempts, until demodulation succeeds, to demodulate signals received via remaining second communication resources, to acquire the second control information.

5. A transmitting apparatus comprising:

a first selecting unit configured to select one of first communication resources, the first communication resources being included in a first transmission band, having respective independent numbers, and having sizes selected from a number of resource sizes;

a first transmitting unit configured to transmit first control information using the selected first communication resource;

a second selecting unit configured to select one of second communication resources, the second communication resources being included in a second transmission band, having respective independent numbers, and having sizes selected from a number of resource sizes; and a second transmitting unit configured to transmit second control information using a selected second communication resource, wherein if the second communication resources include a certain second communication resource that has a same number as one first communication resource used to transmit the first control information and is available, the second selecting unit selects the certain second communication resource;

if the certain second communication resource is unavailable and if the second communication resources include another second communication resource that has a same size as the one first communication resource and is available, the second selecting unit selects the another second communication resource;

if the another second communication resource is unavailable and if yet another second communication resource that has a same number as the one first communication resource and is available is included in second communication resources having a same size as the one first communication resource, the second selecting unit selects the yet another second communication resource; and if the yet another second communication resource is unavailable, the second selecting unit selects one of remaining second communication resources that are not subjected to a determination as to whether the remaining second communication resources are available.

6. A transmitting method comprising:

transmitting first control information using one of first communication resources, the first communication resources being included in a first transmission band and having respective independent numbers;

transmitting second control information using one of second communication resources, the second communication resources being included in a second transmission band and having respective independent numbers;

restricting the second communication resources to restricted second communication resources in accordance with a number assigned to one of the first communication resources used to transmit the first control information;

selecting one second communication resource from the restricted second communication resources, the second control information using the selected second communication resource being transmitted.

7. The method according to claim 6, wherein the restricted second communication resources have a same size as one first communication resource used to transmit the first control information.

8. The method according to claim 6, wherein if the second communication resources include a certain second communication resource that has a same number as one first communication resource used to transmit the first control information and is available, the certain second communication resource is selected;

if the certain second communication resource is unavailable and if the second communication resources include another second communication resource that has a same size as the one first communication resource and is available, the another second communication resource is selected;

if the certain second communication resource is unavailable, if the another second communication resource is unavailable, and if yet another second communication resource that has a same number as the one first communication resource and is available is included in second communication resources having a same size as the one first communication resource, the yet another second communication resource is selected; and if the certain second communication resource is unavailable, if the another second communication resource is unavailable and if the yet another second communication resource is unavailable, one of remaining second communication resources that are not subjected to a determination as to whether the remaining second communication resources are available is selected.

9. A transmitting method comprising:

selecting one of first communication resources, the first communication resources being included in a first transmission band, having respective independent numbers, and having sizes selected from a number of resource sizes;

transmitting first control information using the selected first communication resource;

selecting one of second communication resources, the second communication resources being included in a second transmission band, having respective independent numbers, and having sizes selected from a number of resource sizes; and transmitting second control information using a selected second communication resource, wherein if the second communication resources include a certain second communication resource that has a same number as one first communication resource used to transmit the first control information and is available, the certain second communication resource is selected;

if the certain second communication resource is unavailable and if the second communication resources include another second communication resource that has a same size as the one first communication resource and is available, the another second communication resource is selected;

if the another second communication resource is unavailable and if yet another second communication resource that has a same number as the one first communication resource and is available is included in second communication resources having a same size as the one first communication resource, the yet another second communication resource is selected; and if the yet another second communication resource is unavailable, one of remaining second communication resources that are not subjected to a determination as to whether the remaining second communication resources are available is selected.

10. A receiving method for receiving the first control information and the second control information as recited in claim 8, comprising:

sequentially attempting, until demodulation succeeds, to demodulate signals received via first communication resources included in a first transmission band;

acquiring the first control information;

demodulating signals received via second communication resources included in a second transmission band; and acquiring the second control information, wherein the demodulating the signals received via the second communication resources attempts to demodulate, to acquire the second control information, a signal received via one of the second communication resources that has a same number as one of the first communication resources used to receive the first control information;

if the second control information is not acquired from the signal received via one second communication resource that has a same number as one of the first communication resources used to receive the first control information, the demodulating the signals received via the second communication resources attempts to demodulate, to acquire the second control information, a signal received via another of the second communication resources that has a same size as one first communication resource used to receive the first control information;

if the second control information is not acquired from the signal received via another second communication resource that has a same size as the one first communication resource used to receive the first control information, the demodulating the signals received via the second communication resources attempts to demodulate, to acquire the second control information, a signal received via yet another of the second communication resources that has a same number as the one first communication resource; and if the second control information is not acquired from the signal received via the yet another second communication resource, the demodulating the signals received via the second communication resources sequentially attempts, until demodulation succeeds, to demodulate signals received via remaining second communication resources, to acquire the second control information.

\* \* \* \* \*